UNITED STATES PATENT OFFICE.

JAMES H. MADDY, OF NEW YORK, N. Y., AND BRUNO H. SCHUBERT, OF WEEHAWKEN, NEW JERSEY, ASSIGNORS TO THE LOHMANN COMPANY, OF NEW YORK, N. Y., A CORPORATION OF NEW YORK.

COMPOSITION FOR METAL-COATING OF FERROUS ARTICLES.

1,183,217.  Specification of Letters Patent.  Patented May 16, 1916.

No Drawing.   Application filed February 2, 1915.  Serial No. 5,646.

*To all whom it may concern:*

Be it known that we, JAMES H. MADDY, residing at 610 West One Hundred and Sixteenth street, New York, county of New York, and State of New York, and BRUNO H. SCHUBERT, residing at 224 Jane street, Weehawken, county of Hudson, and State of New Jersey, both citizens of the United States, have invented certain new and useful Improvements in Composition for Metal-Coating of Ferrous Articles, fully described and represented in the following specification.

The object of this invention is to furnish a composition of powdered fusible metal combined with a liquid medium, so that the metal may be used for coating iron and steel articles by application thereto in a plastic condition, and the use of a blow-torch or other suitable means for melting the protective metal upon the surface of the article. This object is attained by mixing powdered metal, as lead, zinc, tin or antimony with a mercury bi-chlorid solution, which serves partly as a medium by which the powdered metal may be painted upon the surface of the article to be coated, and also serves to cause a chemical union of the metal coating with the iron or steel article, and this because mercury operates as hereinafter set forth, to promote the union of the protective metal with the article.

In the coating of iron or steel articles with readily fusible metal, such as lead, zinc, tin and antimony, there is not a strong tendency in the coating metal to adhere to the surface of the iron article, especially if a lead coating be used; and such processes as the ordinary galvanizing process are not effective to produce a complete adhesion of the coating to the article, but form a coating having pin-holes through which the moisture of the atmosphere operates to oxidize the article and dislodge the protective coating.

The employment of soluble mercury bi-chlorid with the fusible metal, as described herein, has been found in practice to cause a chemical union of the coating with the article, and thus produce a more impervious coating and more complete adhesion of the same.

In the present invention, the mercury bi-chlorid is conveniently combined with the powdered metal by mixing it first with any liquid flux, the soluble salt of mercury being adapted to mix in such manner, so that when the flux thus prepared is mixed with the powdered protective metal employed in the coating process it operates to protect the article and the coating metal from oxidation, and supplies a sufficient proportion of mercury to produce a more perfect union of the coating with the article.

To diminish the expense of the flux, a considerable proportion of ammonium chlorid may be added to the zinc chlorid, such addition not diminishing the efficiency of the flux.

In practice, the liquid medium is made by adding five parts by weight of mercury bi-chlorid and ten parts of ammonium chlorid to one hundred parts of zinc chlorid solution, having a strength commercially known as "fifty per cent. zinc chlorid." The liquid medium thus formed is intimately mixed with the powdered metal to form a paint or paste, and applied to the surface of the article to be coated, by a brush or other suitable means, and is melted thereon by means of a hot blast or other heating agent, and the application of heat sufficient to melt the protective coating metal then produces the required adhesion of the coating to the article, with the aid of the mercury, which causes a species of amalgamation between the article and the molten metal, and produces a firm penetrating union of the coating metal.

The invention is applicable to the coating of many large articles, as tanks, car-bodies, bridge-members, structural beams, and other iron or steel articles of too great dimensions to be coated by immersion in a bath of molten metallic metal, and all parts of such objects would be cleaned successively by a sand-blast or other suitable means, before the composition described herein was applied to the surface of the article.

The reduction of the fusible metal to a powdered form permits it to be intimately mixed with the liquid medium, so that the latter may permit painting it upon the article to be coated, and our claims are, therefore, to the composition of the powdered metal with the liquid medium containing mercury bi-chlorid.

Having thus set forth the nature of the invention, what is claimed herein is:

1. A composition for application by hot blast to form a protective metal coating upon an iron or steel article, said composition consisting of a powdered readily fusible metal and a liquid medium containing a small proportion of mercury bi-chlorid solution, as and for the purpose set forth.

2. A composition for application by a hot blast to form a protective metal coating upon an iron or steel article, said composition consisting of a powdered readily fusible metal having a liquid medium intimately mixed therewith and containing mercury bi-chlorid and ammonium-chlorid in substantially the proportions herein set forth.

In testimony whereof we have hereunto set our hands in the presence of two subscribing witnesses.

JAMES H. MADDY.
BRUNO H. SCHUBERT.

Witnesses:
J. G. BELDEN,
A. J. KAY.